United States Patent
Fertner et al.

(10) Patent No.: US 7,395,162 B2
(45) Date of Patent: Jul. 1, 2008

(54) LOAD COIL DETECTION AND LOCALIZATION

(75) Inventors: Antoni Fertner, Stockholm (SE); Fredrik Lindqvist, Älvsjö (SE); Per Ola Börjesson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 155 days.

(21) Appl. No.: 11/276,599

(22) Filed: Mar. 7, 2006

(65) Prior Publication Data

US 2007/0140474 A1    Jun. 21, 2007

Related U.S. Application Data

(60) Provisional application No. 60/743,064, filed on Dec. 21, 2005.

(51) Int. Cl.
    *G06F 19/00*   (2006.01)
(52) U.S. Cl. .......................... 702/57; 324/258
(58) Field of Classification Search ............... 702/57, 702/60–64, 182–185, 188; 324/200, 244, 324/258
    See application file for complete search history.

(56) References Cited

U.S. PATENT DOCUMENTS 4,087,657 A * 5/1978 Peoples ....................... 324/615
4,620,069 A   10/1986 Godwin
5,881,130 A    3/1999 Zhang
6,895,081 B1   5/2005 Schmidt
2005/0135566 A1 6/2005 Schmidt

FOREIGN PATENT DOCUMENTS

| WO | WO 2002/091721    | 11/2002 |
| WO | WO 2004099711 A1  | 11/2004 |
| WO | WO 2004100512 A1  | 11/2004 |
| WO | WO 2004100513 A1  | 11/2004 |
| WO | WO 2007/050001    | 5/2007  |

OTHER PUBLICATIONS

Sunrise Telecom, "SunSet xDSL: Load Coil Testing" Publication No. APP-XDSL-012Rev. B, 2001.
McCarty, Don, MCarty Products, Inc, Outside Plant Magazine Jun. 2001, McCarty Forum Index, Don's Colums, Nov. 12, 2001.
Quest; "Interconnect Mediated Access, Loop Qualification & Raw Loop Data CLEC Job Aid", Release 17.0, Jul. 11, 2005.
Victor Demjanenko and Alberto Torres ; G.hs: Loading Coil Detection; ITU—Telecommunication Standardization Sector Temporary Document WH-095, Study Group 15, Victor Demjanenko and Alberto Torres, VoCAL Technologies Ltd. Buffalo, NY 14228, USA.

* cited by examiner

*Primary Examiner*—Edward Raymond
(74) *Attorney, Agent, or Firm*—Roger S. Burleigh

(57) ABSTRACT

A method is described herein that can be used to detect the presence of a load coil within a transmission line. The method can also be used to determine the number of load coil(s) present within the transmission line. In addition, the method can be used to determine the distance to the first load coil.

20 Claims, 9 Drawing Sheets

---

200

DETERMINE IF LOAD COIL IS PRESENT IN TRANSMISSION LINE BY:

① MEASURING $Z_{in}$

② OBTAINING A REAL VALUED CURVE OF $Z_{in}$ BY APPLYING:

$$\frac{\partial(\text{obs}(Z_{in}))}{\partial \omega} = \frac{\partial(\text{real}(Z_{in}))}{\partial \omega} \text{real}(Z_{in}) + \frac{\partial(\text{imag}(Z_{in}))}{\partial \omega} \text{imag}(Z_{in}) \quad -202$$

③ DETERMINING IF ZERO CROSSING IN REAL VALUED CURVE OF $Z_{in}$:

④ DETERMINING IF ZERO CROSSING CORRESPONDS TO MAXIMA (PEAK) IN ABSOLUTE VALUE OF $Z_{in}$:

④a IF YES, THEN LOAD COIL IS PRESENT

④b IF NO, THEN LOAD COIL IS NOT PRESENT (OPTION: MAY STILL DETECT LOAD COIL IF APPLY EQ. 11)

↓

DETERMINE NUMBER OF LOAD COIL(S) PRESENT IN TRANSMISSION LINE BY:   —204

① COUNTING NUMBER OF MAXIMA (PEAKS) IN ABSOLUTE VALUE OF $Z_{in}$

↓

DETERMINE DISTANCE TO FIRST LOAD COIL BY:

① USING HIGHEST RESONANT FREQUENCY (f)   —206

$$f = \frac{1}{2\pi}\sqrt{\frac{2}{L_{lc}C_{km}(d/2)}} \quad \text{AND} \quad \frac{d}{2} = \frac{2}{(2\pi f)L_{lc}C_{km}}$$

DETERMINE IF LOAD COIL IS PRESENT IN TRANSMISSION LINE BY:

① MEASURING $Z_{in}$

② OBTAINING A REAL VALUED CURVE OF $Z_{in}$ BY APPLYING:

$$\frac{\partial(abs(Z_{in}))}{\partial \omega} \cong \frac{\partial(real(Z_{in}))}{\partial \omega} \cdot real(Z_{in}) + \frac{\partial(imag(Z_{in}))}{\partial \omega} \cdot imag(Z_{in})$$

③ DETERMINING IF ZERO CROSSING IN REAL VALUED CURVE OF $Z_{in}$;

④ DETERMINING IF ZERO CROSSING CORRESPONDS TO MAXIMA (PEAK) IN ABSOLUTE VALUE OF $Z_{in}$:

④a IF YES, THEN LOAD COIL IS PRESENT

④b IF NO, THEN LOAD COIL IS NOT PRESENT (OPTION: MAY STILL DETECT LOAD COIL IF APPLY EQ. 11)

— 202

DETERMINE NUMBER OF LOAD COIL(S) PRESENT IN TRANSMISSION LINE BY:

① COUNTING NUMBER OF MAXIMA (PEAKS) IN ABSOLUTE VALUE OF $Z_{in}$

— 204

DETERMINE DISTANCE TO FIRST LOAD COIL BY:

① USING HIGHEST RESONANT FREQUENCY (f)

$$f = \frac{1}{2\pi} \sqrt{\frac{2}{L_{lc} C_{km}(d/2)}} \quad \text{AND} \quad \frac{d}{2} = \frac{2}{(2\pi f) L_{lc} C_{km}}$$

LOAD COIL DETECTION AND LOCALIZATION

CLAIMING BENEFIT OF PRIOR FILED PROVISIONAL APPLICATION

This application claims the benefit of U.S. Provisional Application Ser. No. 60/743,064 filed on Dec. 21, 2005 and entitled "Load Coil Detection and Localization" the contents of which are incorporated by reference herein.

BACKGROUND OF THE INVENTION

1. Field of the Invention

The present invention relates in general to the field of transmission line analysis.

2. Description of Related Art

The following abbreviations are herewith defined, at least some of which are referred to in the ensuing description of the prior art and the preferred embodiment of the present invention.

CO Central Office
CPM Copper Plant Management System
DSL Digital Subscriber Line
ETSI European Telecommunications Standards Institute
ETSIxx Cable Reference Model According to ETSI/STC TM6(97)02, Revision 3: 970p02r3, e.g., ETSI50 depicts 0.50 mm cable.
NB-SELT Narrow Band Single-Ended Line Test
POTS Plain Old Telephone Service
SELT Single-Ended Line Test An operator of a telecommunication network has a great interest in measuring the properties of their transmission lines. Because, they can use the results of such measurements for e.g. detecting faults, locating faults, predicting certain faults which are about to occur, and estimating the suitability and capacity of a transmission line for certain services, such as DSL. The operator can use a variety of tests to measure the properties of a transmission line. For example, the operator can use a POTS test so they can maintain and diagnose a customer's narrowband (4 kHz) connection.

In addition, the operator can perform a single-ended line test (e.g., NB-SELT) in which properties of a transmission line can be estimated from measurements made at one end of the line. For instance, the single-ended line test enables the length of the transmission line to be measured by sending a pulse and measuring the time until a reflected pulse is received back. In addition, the single-ended line test enables the capacitance of the transmission line to be estimated by applying a voltage to the transmission line, then removing it and measuring the voltage decay time. Unfortunately, there is not a single-ended line test available today which can be used to detect the presence of a load coil in a transmission line. The ability to detect a load coil is desirable. Because, if there is a load coil present within the transmission line then that would disqualify the transmission line from supporting a DSL service. But, if the operator can detect a load coil then they could remove the load coil so the transmission line can now support a DSL service. This is made possible by the present invention.

BRIEF DESCRIPTION OF THE INVENTION

The present invention is related to a device and method that can perform a single-ended line test and determine if there is a load coil present within a transmission line. The device and method can determine whether or not there is a load coil present within a transmission line by: (1) measuring an input impedance $Z_{in}$ of the transmission line; (2) obtaining a real valued curve of the measured input impedance $Z_{in}$ (wherein the real valued curve corresponds to a derivate of the measured input impedance $Z_{in}$); and (3) determining if there is a zero crossing within the real valued curve of the measured input impedance $Z_{in}$; (4) determining if the zero crossing corresponds to a maxima (peak) in an absolute value of the measured input impedance $Z_{in}$ wherein (i) if a maxima (peak) is present then the transmission line contains a load coil; or (ii) if a maxima (peak) is not present then the transmission line does not contain a load coil (option: if transmission line's resonant frequency is greater 4 KHz then one may still detect a load coil by transforming the input impedance $Z_{in}$ pursuant to EQ. 11 and analyzing the transformed input impedance $Z_{in}$). In addition, the device and method can determine how many load coils are present within the transmission line. Moreover, the device and method can determine the distance that the first load coil on the transmission line is located from a central office.

BRIEF DESCRIPTION OF THE DRAWINGS

A more complete understanding of the present invention may be had by reference to the following detailed description when taken in conjunction with the accompanying drawings wherein:

FIG. 2 is a flowchart illustrating the basic steps of the method in accordance with the present invention.

DETAILED DESCRIPTION OF THE DRAWINGS

Figure 1:
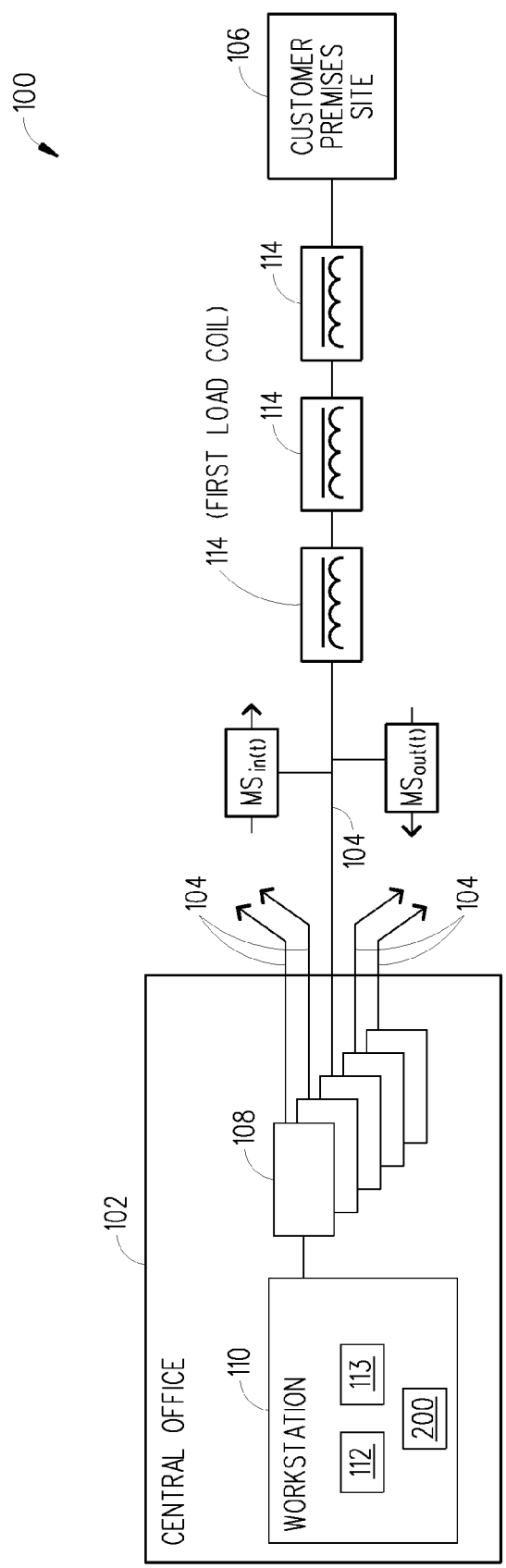
FIG. 1 is a simplified diagram of a telecommunications network which is used to help explain a method in accordance with the present invention.

Referring to FIG. 1, there is shown a simplified block diagram of a telecommunications network 100 which is used to help explain a method 200 in accordance with the present invention. The telecommunications network 100 has a central office (CO) 102 at which there is terminated one end of a series of transmission lines 104. And, the other end of the transmission lines 104 terminate at customer premises sites 106 (one shown). Inside, the central office 102 there is a series of line cards 108 each of which is connected to one end of the transmission lines 104. The CO 102 also has a workstation 110 (copper plant manager 110) which interfaces with the line cards 108 so it can conduct a single-ended line test in accordance with the method 200 of the present invention. Basically, the workstation 110 (which includes a processor 112 and a memory 113) performs the single-ended line test and determines if there is a load coil 114 present within a particular transmission line 104 (see step 202 in FIG. 2). The ability to detect a load coil 114 is important because if there is a load coil 114 located within the transmission line 104 then that would disqualify the transmission line 104 from supporting a DSL service. And, if the detected load coil 114 is removed from the transmission line 104 then that transmission line 104 would be able to support a DSL service. A detailed discussion about how the load coil 114 can be detected in accordance with the present invention is provided following a brief discussion about why load coil(s) 114 were installed on the transmission line 104 in the first place.

Historically, the load coils 114 were installed on the transmission line 104 to reduce attenuation in the POTS band (but at the cost of increased attenuation at higher frequencies which are now used by the DSL service). And, the common practice was that transmission lines 114 longer than 18 kft were equipped with load coils 114. The load coils 114 were typically placed on the transmission lines 114 at regular intervals of either 6 or 4.5 kft (these were denoted by letters H and D, respectively). The first load coil 114 appeared about half of this distance from the CO 102. The last load coil 114 was typically located about 3 kft from the customer premises sites 106. However, the distance from the last coil 114 to the customer premises 106 may be in some cases up to 10 kft. The load coils 114 were typically 88 or 66 mH inductors, but some were 44 mH inductors. The typical identification schemes were H88 and D66. The subscribers (and bridged taps) were never placed between two loading coils 114. However, because of loop reconfigurations, installations on new COs 102 etc . . . there were left a number of short transmission lines 104 which had one or two load coils 114. And since, the records of the copper plant changes are often inaccurate and/or insufficient, nobody can be sure which transmission lines 104 still contain load coils 114. As a result, there can be numerous transmission lines 104, which could qualify to DSL service only if the load coils 114 could be detected and removed. Therefore, it is essential to detect these load coils 114. How this is done is described next.

The workstation 110 can determine if there is a load coil 114 present within a particular transmission line 104 by: (1) measuring an input impedance $Z_{in}$ of the transmission line 104; (2) obtaining a real valued curve of the measured input impedance $Z_{in}$ (wherein the real valued curve corresponds to a derivate of the absolute value of the measured input impedance $Z_{in}$); (3) determining if there is a zero crossing within the real valued curve of the measured input impedance $Z_{in}$; (4) determining if the zero crossing corresponds with a maxima (peak) in an absolute value of the measured input impedance $Z_{in}$ wherein (i) if a maxima (peak) is present then the transmission line 104 contains a load coil 114; or (ii) if a maxima (peak) is not present then the transmission line 104 does not contain a load coil 114 (see step 202 in FIG. 2)(option: if transmission line's resonant frequency is greater 4 KHz then one may still detect a load coil by transforming the input impedance $Z_{in}$ pursuant to EQ. 11 and analyzing the transformed input impedance $Z_{in}$)

In one embodiment, the workstation 110 can measure the input impedance $Z_{in}$ of the transmission line 104 by following a process disclosed in a co-assigned PCT Patent Application PCT/SE2005/001619 filed on Oct. 27, 2005 and entitled "Method, Device and Program Product for Estimating Properties of a Telecommunication Transmission Line". The contents of this patent application are incorporated by reference herein. However, a brief description about how the workstation 110 can measure the input impedance $Z_{in}$ of a transmission line 104 using the process disclosed in this patent application is provided next.

The workstation 110 measures the input impedance $Z_{in}$ of the transmission line 104 by sending a measurement signal $MS_{in}(t)$ in digital form to a line card 108 which is then sent on the corresponding transmission line 104. A return signal is received from the transmission line 104 and supplied from the line card 108 in digital form as signal $MS_{out}(t)$ to the workstation 110. Then, the workstation 110 converts the digital signals $MS_{in}(t)$ and $MS_{out}(t)$ into a frequency domain representation by using a conventional FFT transform, wherein the signal $MS_{in}(t)$ is transformed to a signal $V_{in}(f)$ and the signal $MS_{out}(t)$ is transformed to a signal $V_{out}(f)$. The relationship between the sent and received signals as a function of frequency is called the echo transfer function, $H_{echo}(f)$. And, it is defined as $H_{echo}(f)=V_{out}(f)/V_{in}(f)$.

The echo transfer function $H_{echo}(f)$ is complex valued and depends both on the characteristics of the transmission line 104 and on the characteristics of the line card 108 (and in particular the transceiver within the line card 108). Hence, to determine a line input impedance $Z_{in}(f)$ from the echo transfer function $H_{echo}(f)$, the characteristics of this transceiver need to be considered. The transceiver's influence may be characterised by three calibration parameters, $Z_{ho}(f)$, $Z_{hyb}(f)$ and $H_\infty(f)$. These are all complex valued and frequency dependent. A detailed discussion about how to determine and use these calibration parameters $Z_{ho}(f)$, $Z_{hyb}(f)$ and $H_\infty(f)$ is described in patent applications PCT/SE2004/000296, PCT/SE2004/000566 and PCT/SE2004/000718 (published as WO2004/100512, WO2004/100513 and WO2004/099711). The contents of these documents are incorporated by reference herein.

At this point, the complex valued frequency dependent input impedance $Z_{in}(f)$ of the transmission line 104, as seen from the interface of the line board 108 can be calculated as follows:

$$Z_{in}(f)=(Z_{ho}(f)-Z_{hyb}(f) \cdot H_{echo}(f))/(H_{echo}(f)-H_\infty(f))$$

Of course, there may be other ways to measure the input impedance $Z_{in}(f)$ of the transmission line 104 and anyone of those ways can be used by the present invention.

After, the workstation 110 determines the input impedance $Z_{in}$ of the transmission line 104, then it determines if there is a zero crossing within a real valued curve of the measured input impedance $Z_{in}$ (see step 202 in FIG. 2). The real valued curve can be obtained by applying the measured input impedance $Z_{in}$ to the following equation:

$$\frac{\partial (\text{abs}(Z_{in}))}{\partial \omega} \cong \frac{\partial (\text{real}(Z_{in}))}{\partial \omega} \cdot \text{real}(Z_{in}) + \frac{\partial (\text{imag}(Z_{in}))}{\partial \omega} \cdot \text{imag}(Z_{in}).$$

If a zero crossing is present and its slope is negative (which corresponds to a maxima (peak) in the absolute value of the measured input impedance $Z_{in}$), then the transmission line 104 contains a load coil 114. And, if there is no zero crossing present which corresponds with a maxima (peak) in the absolute value of the measured input impedance $Z_{in}$, then the transmission line 104 does not contain a load coil 114 (see discussion related to FIG. 7 also see option if transmission line's resonant frequency is greater 4 KHz then one may still detect a load coil by transforming the input impedance $Z_{in}$ pursuant to EQ. 11 and analyzing the transformed input impedance $Z_{in}$).

In addition, the workstation 110 is able to determine the number of load coils 114 that are present within the transmission line 104 (see step 204 in FIG. 2). This is performed by counting the maxima (peaks) in the absolute value of the measured input impedance $Z_{in}$. Moreover, the workstation 110 is able to determine the distance from the CO 102 to the first load coil 114 (see step 206 in FIG. 2). This is performed by using the highest resonance frequency associated with the input impedance $Z_{in}$. In particular, the distance can be calculated by using the following relation:

$$f = \frac{1}{2\pi} \sqrt{\frac{2}{L_{LC} C_{km}(d/2)}}.$$

where:

$L_{LC}$ is the inductance of the detected load coil 114;

$C_{km}$ is the capacitance per km of the transmission line 104; and d/2 is the distance from CO to the first load coil 114.

And, from this relation the distance to the first load coil 114 can be determined as follows (see step 206a in FIG. 2):

$$\frac{d}{2} = \frac{2}{(2\pi f)^2 L_{LC} C_{km}}$$

A detailed discussion/analysis is provided next to help describe how the workstation 110 can determine and analyze the input impedance $Z_{in}$ to (1) detect a load coil 114; (2) identify the number of load coils 114; and (3) estimate the distance to the first load coil 114. The following discussion/analysis is divided into these subjects:

1. Introduction
2. Chain Matrix Representation of Two-Port Networks.
3. Simulation Results.
4. Detecting the Peaks Caused by Load Coils.
5. The Distance to the First Load Coil.
6. The Electrical Circuits and Continued Fraction Expansion.
7. Conclusions.

1. Introduction

The characteristics of the transmission line 104 depend on the type and length of the copper line, the presence of load coils 114, the presence of bridged taps (not shown) and impedance mismatches. Again, the load coils 114 were deployed to reduce the loss of signals in the POTS band. However, the reflections caused by the load coils 114 influence the channel transfer function which causes a serious loss of line capacity such that the transmission line 104 is not able to support a DSL service. This line capacity can be regained by removing the load coils 114 from the transmission line 104. Of course, the technician's time and cost in detecting and removing the load coils 114 can be reduced if they have accurate information about whether or not load coil(s) 114 are present in the first place and if they are then provide them with information about the number and locations of the detected load coils 114. The present invention satisfies these needs and other needs such that load coil(s) 114 can be removed from transmission lines 104. In the following description, the load coils 114 are analytically modeled and then an investigation is provided into the phenomena caused by the presence of load coils 114.

2. Chain Martix Representation of Two-Port Network

In classical network theory, chain matrix representation is widely used to deal with the cascade connection of electrical circuits. And, the transmission line 104 is usually described by the following chain matrix (ABCD-matrix):

$$\begin{bmatrix} A & B \\ C & D \end{bmatrix} = \begin{bmatrix} \cosh(\gamma d) & Z_0 \cdot \sinh(\gamma d) \\ \frac{1}{Z_0} \cdot \sinh(\gamma d) & \cosh(\gamma d) \end{bmatrix}. \quad \text{EQ. 1}$$

where $\gamma$ is propagation constant and $Z_0$ is characteristic impedance.

A chain matrix of a two-port network representing a load coil 114 is as follows:

$$\begin{bmatrix} A & B \\ C & D \end{bmatrix} = \begin{bmatrix} 1 & j\omega L_{LC} \\ 0 & 1 \end{bmatrix}. \quad \text{EQ. 2}$$

where $L_{LC}$ is coil inductance.

Figure 3:
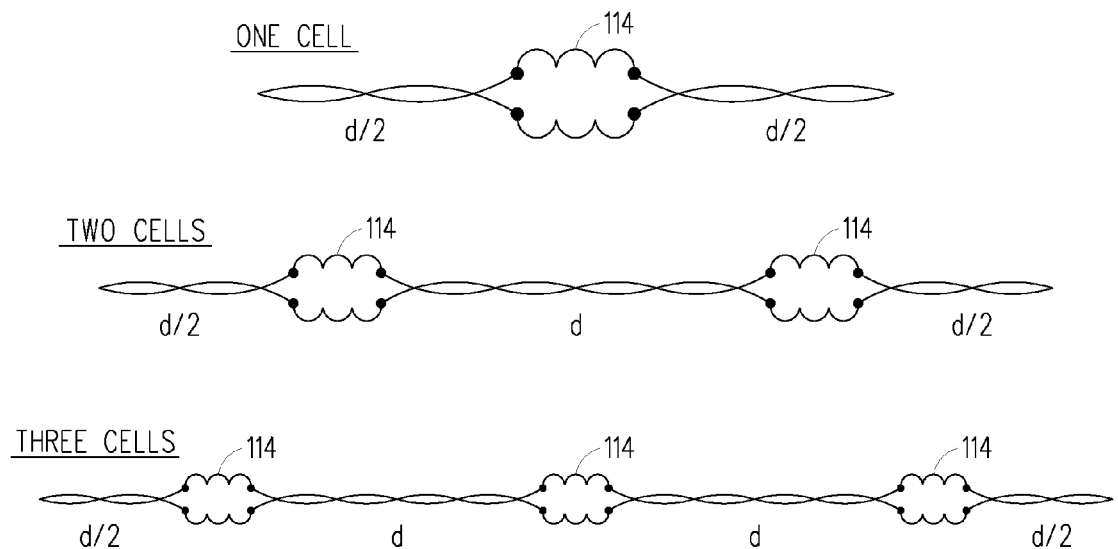
FIGS. 3-15 are various block diagrams and graphs which are used to help explain in theoretical terms how the method of the present invention can: (1) detect a load coil within a transmission line; (2) identify the number of load coils within the transmission line; and (3) estimate the distance to the first load coil within the transmission line.

In the following analysis, the input impedance $Z_{in}$ of the transmission line 104 including load coils 114 is seen as N periodically repeated cells. And, each cell consists of a load coil 114 which has a transmission line of length d/2 connected to each of it's two sides (see FIG. 3 which depicts 1, 2 and 3 cascaded cells). Thus, the chain matrix corresponding to the cell, $K_{cell}$, can be obtained by calculating the product of the chain matrices of individual networks as follows:

$$K_{cell} = \begin{bmatrix} \cosh\left(\frac{\gamma d}{2}\right) & Z_0 \cdot \sinh\left(\frac{\gamma d}{2}\right) \\ \frac{1}{Z_0} \cdot \sinh\left(\frac{\gamma d}{2}\right) & \cosh\left(\frac{\gamma d}{2}\right) \end{bmatrix}. \quad \text{EQ. 3}$$

$$\begin{bmatrix} 1 & j\omega L_{LC} \\ 0 & 1 \end{bmatrix} \cdot \begin{bmatrix} \cosh\left(\frac{\gamma d}{2}\right) & Z_0 \cdot \sinh\left(\frac{\gamma d}{2}\right) \\ \frac{1}{Z_0} \cdot \sinh\left(\frac{\gamma d}{2}\right) & \cosh\left(\frac{\gamma d}{2}\right) \end{bmatrix}.$$

After some manipulation, the following is created:

$$K_{cell} = \begin{bmatrix} \cosh(\gamma d) + \frac{j\omega L_{LC}}{2Z_0} \cdot \sinh(\gamma d) & Z_0 \cdot \left\{\sinh(\gamma d) + \frac{j\omega L_{LC}}{2Z_0} \cdot \cosh^2\left(\frac{\gamma d}{2}\right)\right\} \\ \frac{1}{Z_0} \cdot \left\{\sinh(\gamma d) + \frac{j\omega L_{LC}}{Z_0} \cdot \sinh^2\left(\frac{\gamma d}{2}\right)\right\} & \cosh(\gamma d) + \frac{j\omega L_{LC}}{2Z_0} \cdot \sinh(\gamma d) \end{bmatrix}. \quad \text{EQ. 4}$$

Next, the input impedance $Z_{in}$ can be calculated by using the following chain matrix of N cascaded cells:

$$K_{transmission-line} = (K_{cell})^N \quad \text{EQ. 5.}$$

If the transmission line 104 is terminated with infinite impedance (open-ended), then the calculation of the input impedance $Z_{in}$ is as follows:

$$Z_{in} = \frac{K_{transmission-line}(1, 1)}{K_{transmission-line}(2, 1)}. \quad \text{EQ. 6}$$

And, for a single cell, the input impedance $Z_{in}$ is expressed as follows:

$$Z_{in} = Z_0 \cdot \frac{\cosh(\gamma d) + \frac{j\omega L_{LC}}{2Z_0} \cdot \sinh(\gamma d)}{\sinh(\gamma d) + \frac{j\omega L_{LC}}{2Z_0} \cdot \sinh^2\left(\frac{\gamma d}{2}\right)}. \qquad \text{EQ. 7}$$

If the single cell is terminated with zero impedance (short-circuited), then the following ratio would be used:

$$Z_{in} = \frac{K_{transmission-line}(1,2)}{K_{transmission-line}(2,2)} = Z_0 \cdot \frac{\sinh(\gamma d) + \frac{j\omega L_{LC}}{Z_0} \cdot \cosh^2\left(\frac{\gamma d}{2}\right)}{\cosh(\gamma d) + \frac{j\omega L_{LC}}{2Z_0} \cdot \sinh(\gamma d)}. \qquad \text{EQ. 8}$$

However, a short-end analysis is not relevant for the present invention. Except, that if a short-end is detected then the present invention's analysis need not be performed. In practice, one can detect a short-end by using a process dislosed within the aforementioned PCT Patent Application PCT/SE2005/001619.

3. Preliminary Simulation Results

Figure 4:
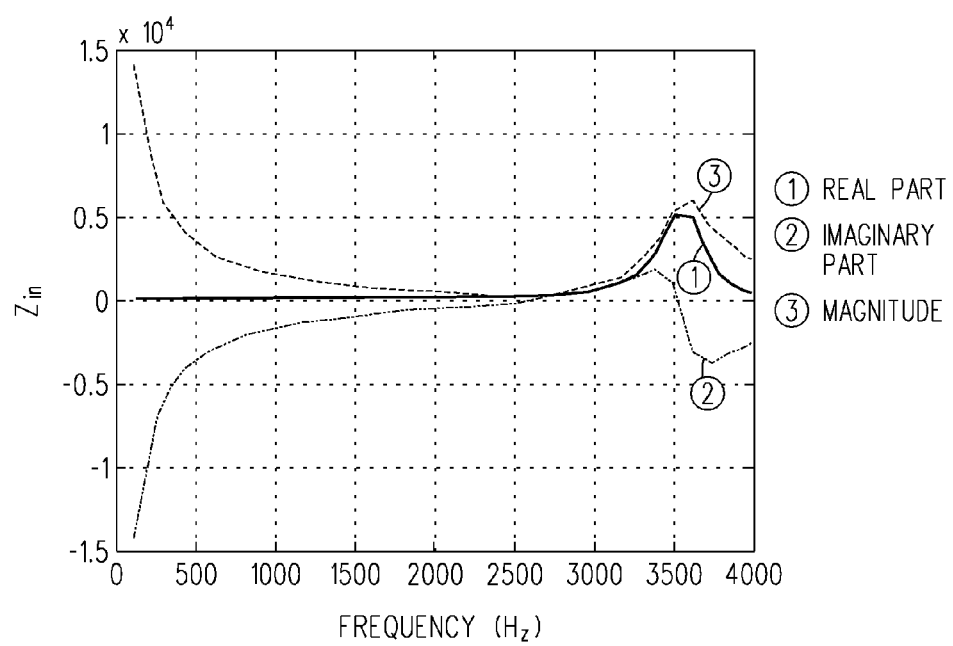
Figure 5:
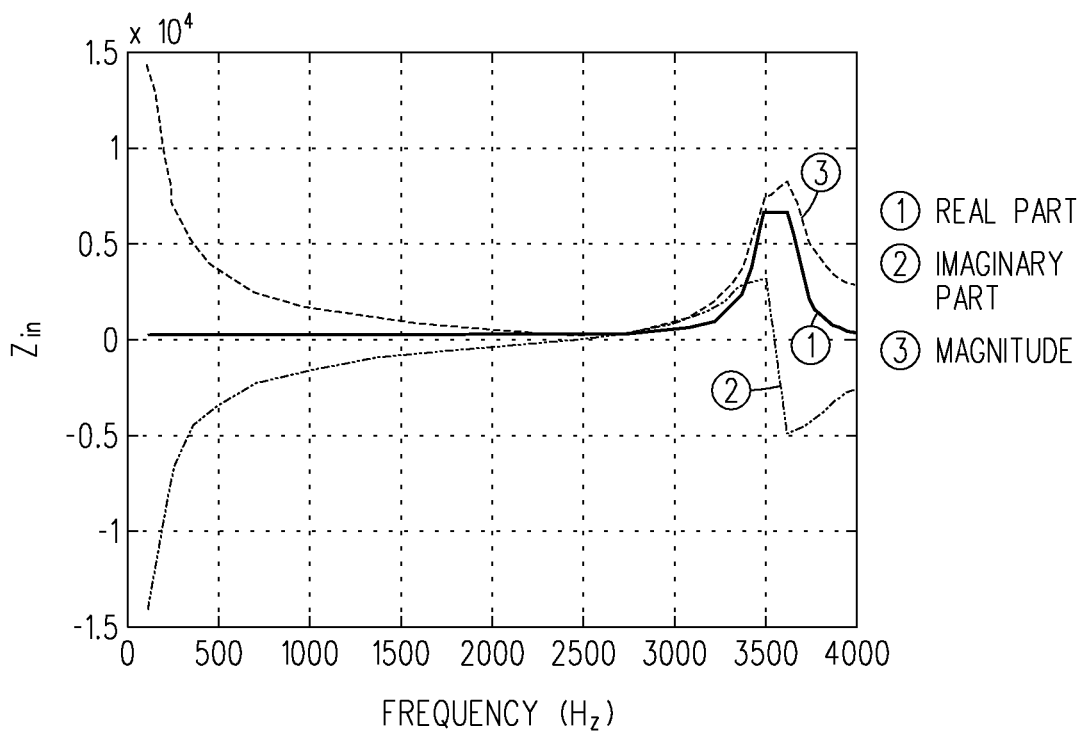
Figure 6:
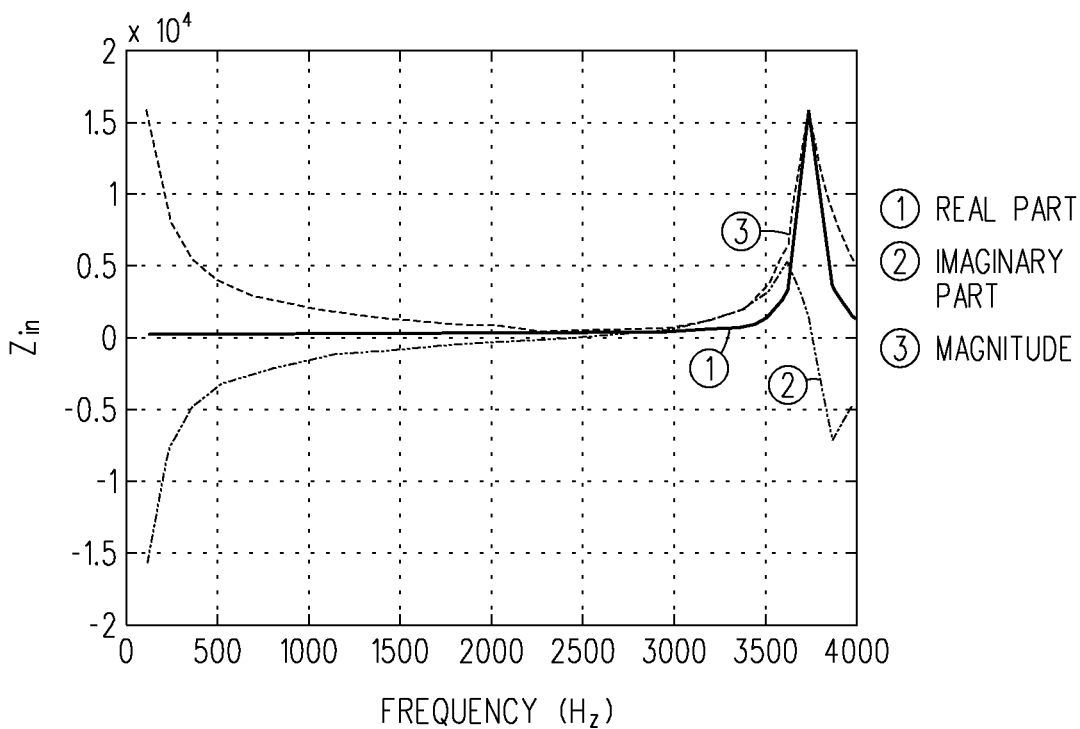
Figure 7:
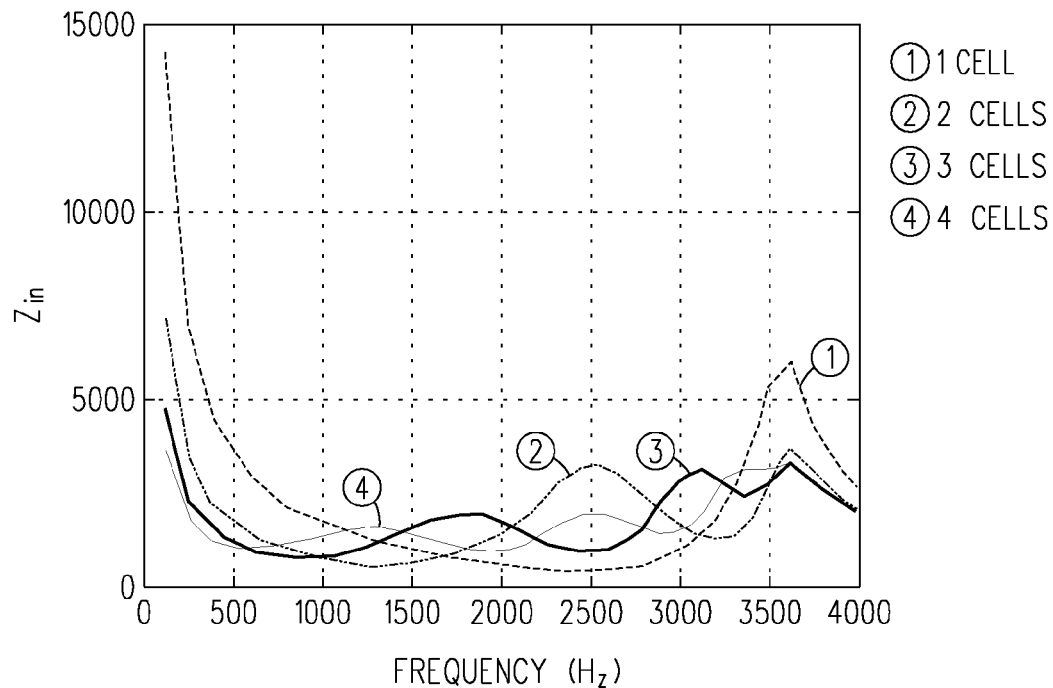

FIGS. 4-6 illustrate plots of different input impedances $Z_{in}$ which correspond to one cell which had a load coil $L_{LC}$=88 mH and 900 m of cable on both sides and where the cable was respectively ETSI40, ETSI50 and ETSI63. And, a sequence of input impedances $Z_{in}$ for ETSI40 cable and 1, 2, 3 and 4 cascaded cells is shown in FIG. 7.

4. Detecting the Peaks Caused by Load Coils

A monotone decrease of magnitude in the input impedance $Z_{in}$ over the relevant frequency range is an indicator that load coils 114 are not present in the transmission line 104. In contrast, if there are peaks in the impedance function $Z_{in}$, then it is likely that a load coil 114 is present in the transmission line 104 (see step 202 in FIG. 2). Each peak implies the presence of a load coil 114. Thus, the number of load 114 coils can be determined by counting the number of peaks (see step 204 in FIG. 2).

As can be seen, the detection of a load coil 114 involves the analysis of the magnitude or the phase of the input impedance $Z_{in}$. A phase-based method is inconvenient, as it requires the calculation of an arc tan function. Whereas, the use of a magnitude-based method makes it much easier to determine the maxima of the input impedance $Z_{in}$. Because, the maxima (zero crossings) of the input impedance $Z_{in}$ can be found by using the following approximate derivate (which generates the real valued curve of the measured input impedance $Z_{in}$):

$$\frac{\partial(\text{abs}(Z_{in}))}{\partial \omega} \cong \frac{\partial(\text{real}(Z_{in}))}{\partial \omega} \cdot \text{real}(Z_{in}) + \frac{\partial(\text{imag}(Z_{in}))}{\partial \omega} \cdot \text{imag}(Z_{in}). \qquad \text{EQ. 9}$$

This equation can be used to correctly detect the zero crossing of the true derivate; otherwise, it will diverge from it considerably. The sign of the second derivate needs to be checked to distinguish the maxima from the minima. An exemplary Matab language program is presented below that can be used to find the zero crossings which correspond to the maxima(s) of the absolute value of the input impedance $Z_{in}$:

```
%
dre      = diff(Real_part_Z_in);
reinp    = filter([1 1], 1 , Real_part_Z_in);
dim      = diff(Imaginary_part_Z_in);
iminp        = filter([1 1], 1, Imaginary_part_Z_in);
dabs     = (reinp(2:end).*dre+iminp(2:end).*dim)/2048;
Zsd      = diff(dabs);
f_resonans = [ ];
% f_before = [ ];
% %
   for k = 1:length(f_Meas)-2
      if Zsd(k)<0
         if(dabs(k)*dabs(k+1))<0
            f_resonans = [f_resonans f_Meas(k+1)];
         end
%     else
%          if(dabs(k)*dabs(k+1))<0
%             f_before = [f_before f_Meas(k+1)];
%          end
     end
   end
% f_resonans
```

Optionally, this equation can be used to detect the peak(s) outside the actual frequency band.

5. The Distance to the First Load Coil

In practice, the network may not be homogeneous. For example, when the line sections have different characteristic impedances and lengths, then the chain matrix defined by EQ. 3 can be calculated by the multiplication of its constituting elements as follows:

$$K_{cell} = \begin{bmatrix} \cosh(\gamma_1 d_1) & Z_{01} \cdot \sinh(\gamma_1 d_1) \\ \frac{1}{Z_{01}} \cdot \sinh(\gamma_1 d_1) & \cosh(\gamma_1 d_1) \end{bmatrix} \cdot \begin{bmatrix} 1 & j\omega L_{LC} \\ 0 & 1 \end{bmatrix}. \qquad \text{EQ. 10}$$

$$\begin{bmatrix} \cosh(\gamma_2 d_2) & Z_{02} \cdot \sinh(\gamma_2 d_2) \\ \frac{1}{Z_{02}} \cdot \sinh(\gamma_2 d_2) & \cosh(\gamma_2 d_2) \end{bmatrix}.$$

Figure 8:
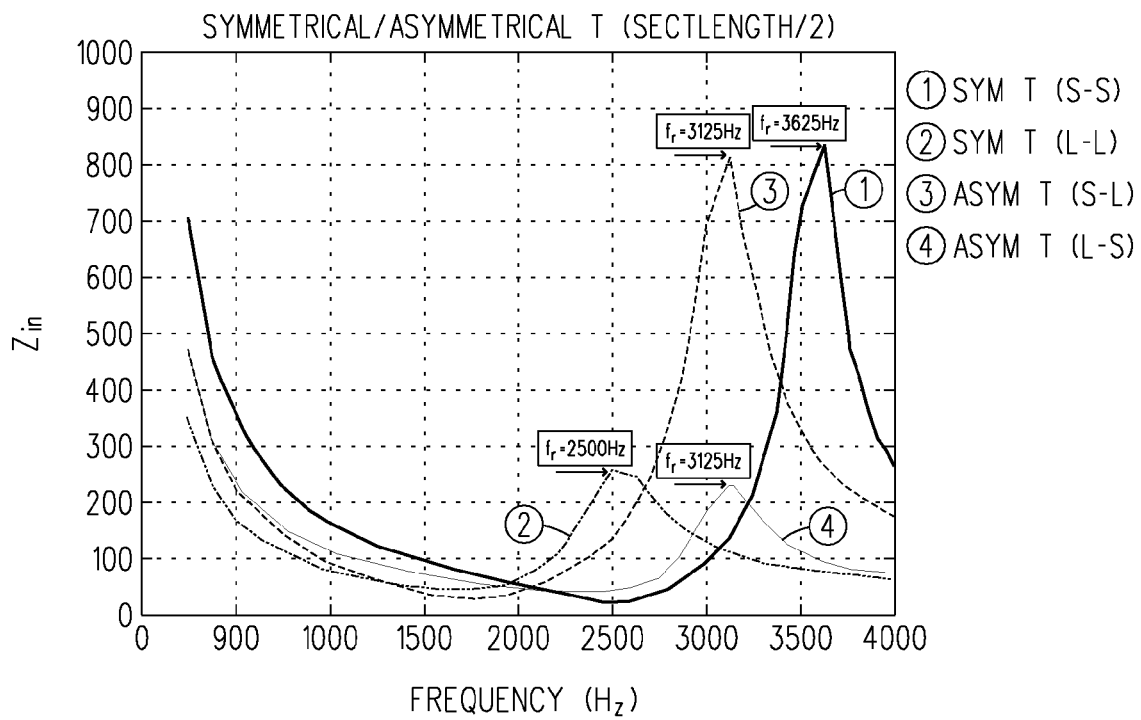

A plot showing the input impedances $Z_{in}$ of $K_{asym\_cells}$ with different lengths of the cables sections (see lines 3 and 4) being compared to the input impedances $Z_{in}$ of $K_{cells}$ (see lines 1 and 2) is shown in FIG. 8. In the $K_{asym\_cells}$, it can be seen that the resonant frequency decreases with section length. This shifting of the peak towards the lower frequency occurs when the cable length of a section increases or some additional cable is connected to the transmission line 104. However, one cannot tell whether the long or short section of the transmission line 104 is first without taking into consideration the magnitude of the peak (see lines 3 and 4).

Figure 9:
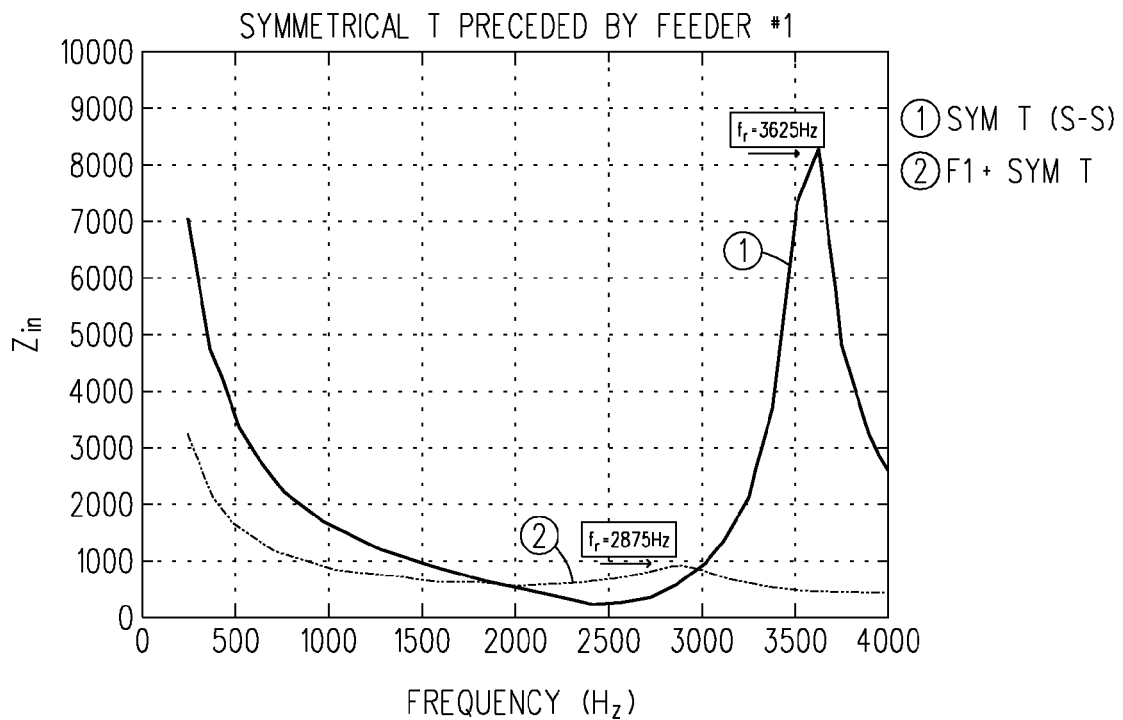

A plot of the input impedance $Z_{in}$ with one single cell preceded by a uniform cable is shown in FIG. 9. As can be seen, the resonant frequency decreases with the insertion of preceding uniform cable. In particular, the extension of the first section by 900 m (0.50 mm ETSI cable) decreased the maximum frequency from 3625 to 3125 Hz while the adding of a cable with length 2225 m before the cell $K_{cell}$ decreased the frequency to 2875 Hz (see FIGS. 8 and 9). As will be discussed below, this resonant frequency which is defined as a zero (or rather minimum) of the denominator of the input impedance $Z_{in}$ is needed to determine the location of the first load coil 114 (see EQS. 13, 16-17 and 22).

Figure 10:
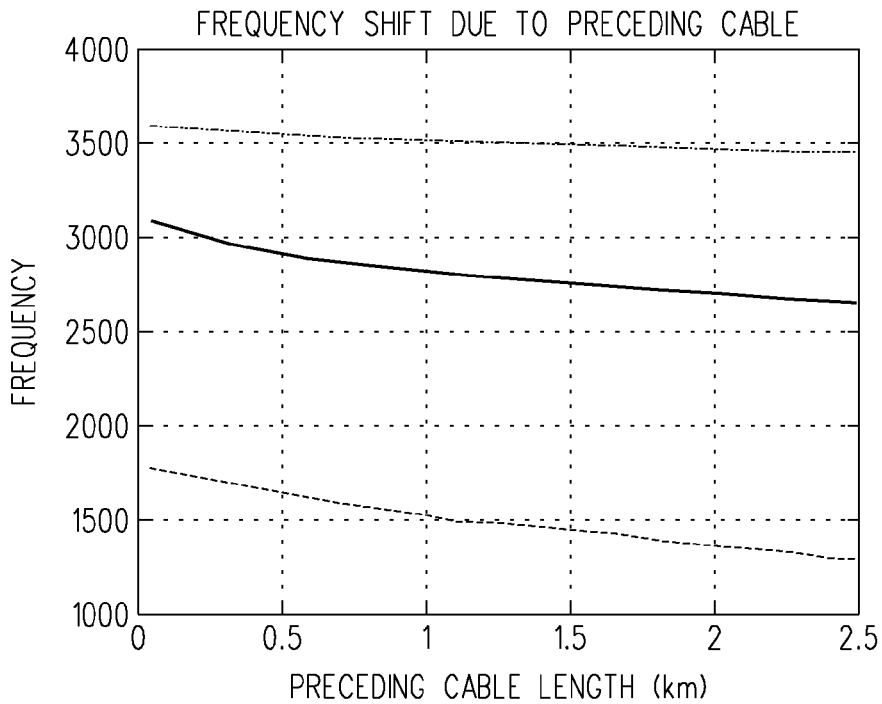

A case in which three cells consisting of 900 m ETSI50 cable sections and 88 mH load coils 114 preceded by a cable ETSI40 with a length varying from 50 m to 2.5 km is discussed next. FIG. 10 indicates that the frequency shift is more noticeable for the lower resonant frequencies then it is for higher resonant frequencies. In particular, if there is 2 km of proceeding cable, then the first resonant frequency is reduced from 3600 Hz to below 3500 Hz, the second resonant frequency is reduced from 3100 Hz to 2700 Hz, and so on.

Figure 11:
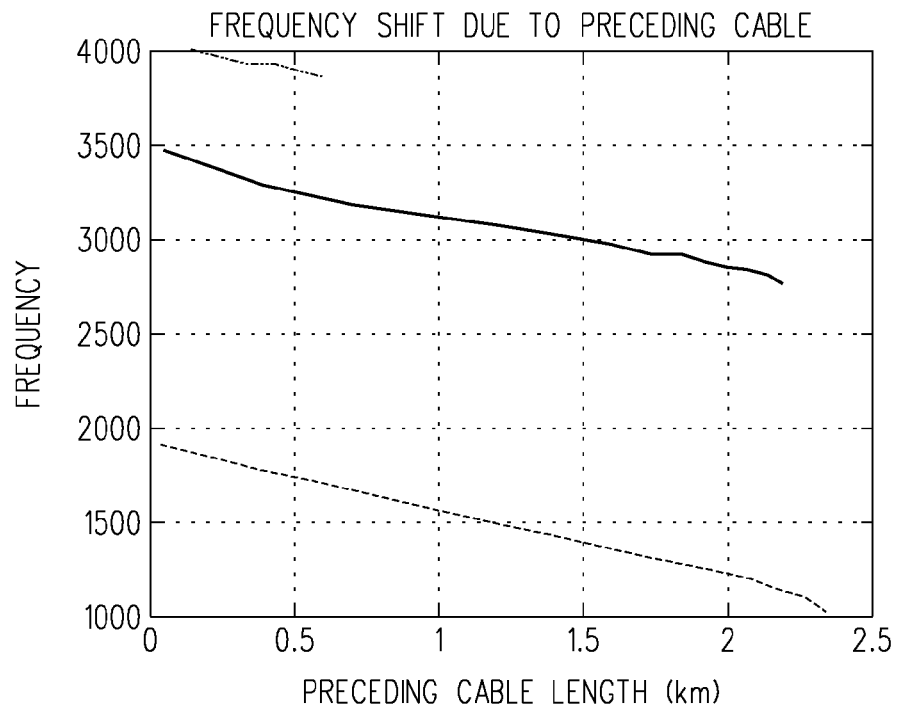

In analyzing FIG. 10, a particular phenomena can be observed. In particular, if cables (e.g., ETSI32, ETSI90) have a highest resonant frequency above the 4 kHz band which is normally unobservable, then the preceding cable can shift the resonant frequency into the measurement band. This is demonstrated in FIG. 11. However, it can also be seen, that the highest resonant frequency cannot be measured for cable lengths (ETSI cables) which exceed 600 m of extra cable if three or more load coils 114 are present. This peak is still there but it is masked by a combination of attenuation and the piling-up on the previous peak slope.

Figure 12:
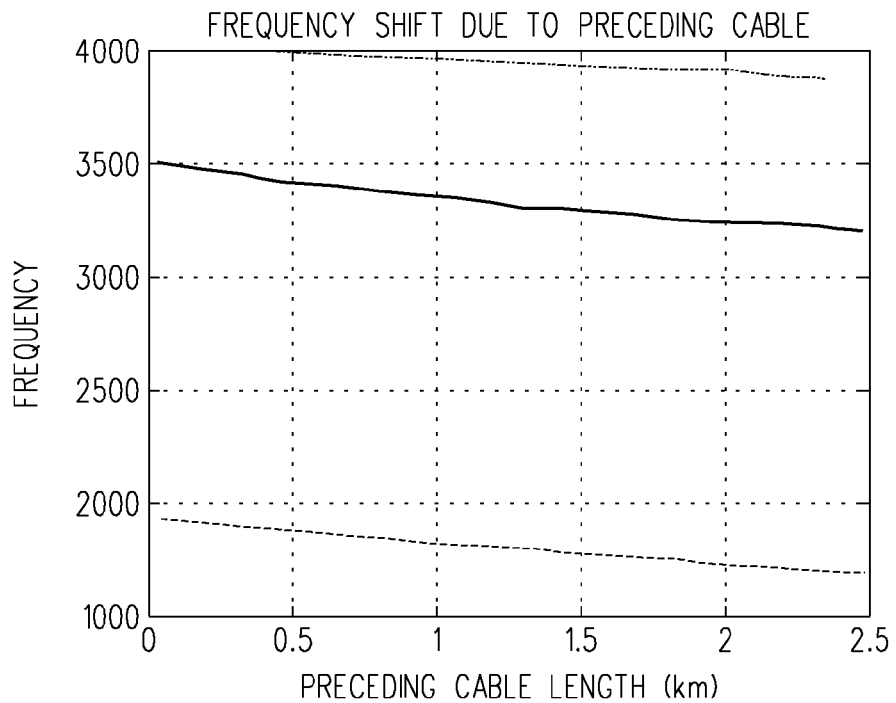

This particular observation gave rise to the idea of artificially shifting resonant frequencies. To illustrate this point, assume that an artificially created, non-existent cable precedes the three cascaded cells considered in the previous example. Then, the measured input impedance $Z_{in}$ would be transformed according to:

$$Z_{in-trans} = \frac{A \cdot Z_{in-meas} + B}{C \cdot Z_{in-meas} + D}. \qquad \text{EQ. 11}$$

where the chain matrix elements A, B, C and D corresponds to the artificial lossless cable, R=G=0 when ad-hoc values of C=15 nF/km and L=1 mH are chosen. In this case, the value of the line inductance is negligibly small in comparison to inductance of the load coil 114, $L_{LC}$; hence, it does not particularly influence the resonant frequencies. The result of altering the measured input line impedance $Z_{in}$ according to EQ. 10 is illustrated in FIG. 12.

Hence, for cables such as ETSI32, ETSI90 for which resonant frequency is above 4 kHz, one can detect a normally unobservable load coil 114 by applying EQ. 11 which transforms the input impedance $Z_{in}$ where A, B, C, and D corresponds to chain matrix elements of the artificial cable. This scenario would be used when the absolute value of the input impedance $Z_{in}$ is not a monotonically decreasing function and has no maxima. Then, one would perform the following steps: (1) obtain a real valued curve of the transformed input impedance $Z_{in-trans}$ (wherein the real valued curve corresponds to a derivate of the transformed input impedance $Z_{in-trans}$); (2) determine if there is a zero crossing within the real valued curve of the transformed input impedance $Z_{in-trans}$; and (3) determine if the zero crossing corresponds to a maxima (peak) in the absolute value of the transformed input impedance $Z_{in-trans}$ wherein (i) if a maxima (peak) is present then the transmission line 104 contains a load coil 114; or (ii) if a maxima (peak) is not present then the transmission line 104 does not contain a load coil 114.

6. The Electrical Circuits and Continued Fraction Expansion

Figure 13:
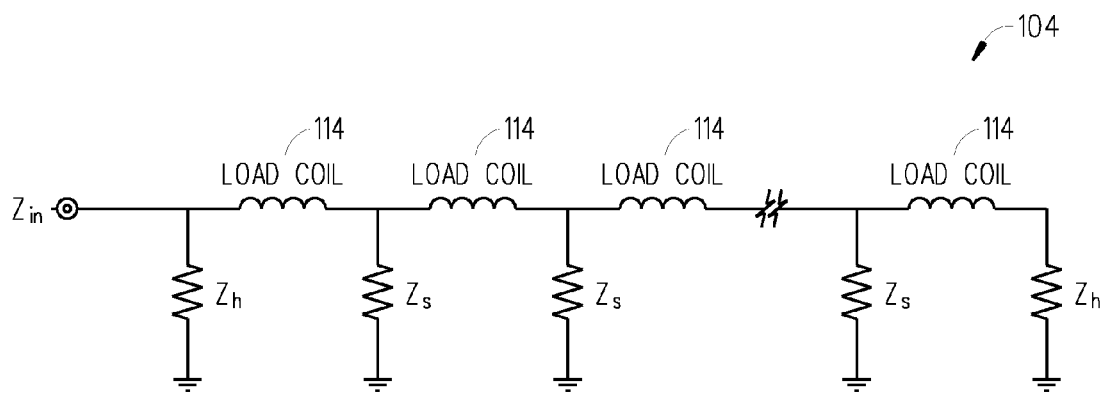

A transmission line 104 including load coils 114 can be interpreted as a series of periodically repeated impedances. This is graphically represented in FIG. 13 where the transmission line 104 has sections with equivalent shunt impedances $Z_s$ which are connected with load coils 114. The first (and last) impedance in the circuit is shown as a shunt impedance $Z_h$.

The total input impedance $Z_{in}$ of cascaded N cells can be represented by a continued fraction expansion as follows:

$$Z_{in}^{(N)} = \cfrac{1}{\cfrac{1}{Z_h} + \cfrac{1}{j\omega L_{LC} + \cfrac{1}{\cfrac{1}{Z_s} + \cfrac{1}{j\omega L_{LC} + \cfrac{1}{\cfrac{1}{Z_s} + \cfrac{1}{j\omega L_{LC} + \cdots \cfrac{1}{j\omega L_{LC} + Z_h}}}}}}} \qquad \text{EQ. 12}$$

where $Z_h$ depicts equivalent shunt impedance of the transmission line of length d/2 and $Z_s$ depicts the equivalent shunt impedance of the transmission line of length d. In the simplest form, impedances $Z_h$ and $Z_s$ can be approximated by a capacitance (or R-C network)(see TABLES 1 and 2).

EQ. 12 is used to prove that the highest resonant frequency can be used to find the distance from the CO 102 to the first load coil 114 (see FIG. 1 and step 206 in FIG. 2). In this proof, the symbolic value of a continued fraction is computed for 1, 2, and 3 cells and then a denominator of the resulting input impedances $Z_{in}$ are examined to find the resonant frequencies.

The input impedance $Z_{in}$ for the single cell may be expressed as:

$$Z_{in}^{(1)} = \cfrac{1}{\cfrac{1}{Z_h} + \cfrac{1}{j\omega L_{LC} + Z_h}} = \frac{Z_h \cdot (j\omega L_{LC} + Z_h)}{j\omega L_{LC} + 2Z_h}. \qquad \text{EQ. 13}$$

and by substituting $$Z_h \cong \frac{1}{j\omega C_{km} \cdot (d/2)}. \qquad \text{EQ. 14}$$

the approximate value of the resonant frequency can be obtained as a zero of the denominator as follows (see step 206 in FIG. 2):

$$f = \frac{1}{2\pi} \cdot \sqrt{\frac{2}{L_{LC} C_{km}(d/2)}}. \qquad \text{EQ. 15}$$

This formula gives 3577 Hz for ETSI40 and ETSI50 cables, 3770 Hz for ETSI63 and 3999 Hz for ETSI32 and ETSI90 cables. These values agreed very well with various simulations.

The input impedance $Z_{in}$ for two cascaded cells may be expressed as:

$$Z_{in}^{(2)} = \cfrac{1}{\cfrac{1}{Z_h} + \cfrac{1}{j\omega L_{LC} + \cfrac{1}{\cfrac{1}{Z_s} + \cfrac{1}{j\omega L_{LC} + Z_h}}}} \quad \text{EQ. 16}$$

$$= \cfrac{1}{\cfrac{1}{Z_h} + \cfrac{1}{j\omega L + \cfrac{Z_s \cdot (j\omega L_{LC} + Z_h)}{j\omega L_{LC} + Z_h + Z_s}}}$$

$$= \cfrac{1}{\cfrac{1}{Z_h} + \cfrac{j\omega L_{LC} + Z_h + Z_s}{j\omega L_{LC} \cdot (j\omega L_{LC} + Z_h + Z_s) + (j\omega L_{LC} + Z_h)}}$$

$$= \cfrac{Z_h \cdot (j\omega L_{LC} \cdot (j\omega L_{LC} + Z_h + Z_s) + Z_s \cdot (j\omega L_{LC} + Z_h))}{j\omega L_{LC} \cdot (j\omega L_{LC} + Z_h + Z_s) + Z_s \cdot (j\omega L_{LC} + Z_h) + Z_h \cdot (j\omega L_{LC} + Z_h + Z_s)}$$

Again, the resonant frequencies correspond to the minima of the denominator. And, after some manipulation the following is obtained:

$$\text{den}(Z_{in}^{(2)}) = (j\Omega L_{LC} + Z_h) \cdot (j\Omega L_{LC} + Z_h + 2Z) \quad \text{EQ. 17.}$$

and by making a further substitution:

$$Z_s \cong \frac{1}{j\omega C_{km} \cdot d} = \frac{1}{2} \cdot Z_h. \quad \text{EQ. 18}$$

the following results:

$$\text{den}(Z_{in}^{(2)}) = (j\Omega L_{LC} + Z_h) \cdot (j\Omega L_{LC} + 2Z_h) \quad \text{EQ. 19.}$$

In this case, two resonant frequencies are obtained as follows (compare to EQ. 15):

$$f_1 = \frac{1}{2\pi}\sqrt{\frac{1}{L_{LC}C_{km}(d/2)}},$$

$$f_2 = \frac{1}{2\pi}\sqrt{\frac{2}{L_{LC}C_{km}(d/2)}}. \quad \text{EQ. 20}$$

This formulae gives 2529 Hz and 3577 Hz for ETSI40 and ETSI50 cables respectively, 2666 Hz and 3770 Hz for ETSI63 and 2828 Hz and 3999 Hz for ETSI32 and ETSI90 cables, see TABLE 1.

TABLE 1*

| | | Resonant frequencies | |
|---|---|---|---|
| | | chain matrix multiplication | Continued Fraction Expansion (imp~C) |
| ETSI32 | $f_1$ | 2828 Hz | 2828 Hz |
| | $f_2$ | >4000 Hz | 3999 Hz |
| ETSI40 | $f_1$ | 2523 Hz | 2529 Hz |
| | $f_2$ | 3609 Hz | 3577 Hz |
| ETSI50 | $f_1$ | 2523 Hz | 2529 Hz |
| | $f_2$ | 3586 Hz | 3577 Hz |
| ETSI63 | $f_1$ | 2656 Hz | 2666 Hz |
| | $f_2$ | 3773 Hz | 3770 Hz |
| ETSI90 | $f_1$ | 2813 Hz | 2828 Hz |
| | $f_2$ | 3991 Hz | 3999 Hz |

*In these tests, the capacitance of the transmission line 104 was used instead of its impedance.

Similarly, the input impedance $Z_{in}$ for three cascaded cells can be expressed as:

$$Z_{in}^{(3)} = \cfrac{1}{\cfrac{1}{Z_h} + \cfrac{1}{j\omega L_{LC} + \cfrac{1}{\cfrac{1}{Z_s} + \cfrac{1}{j\omega L_{LC} + \cfrac{1}{\cfrac{1}{Z_s} + \cfrac{1}{j\omega L_{LC} + Z_h}}}}}}. \quad \text{EQ. 21}$$

Next, the resonant frequencies corresponding the minima of the denominator can be found after some manipulation as follows:

$$Z_{in}^{(3)} = \cfrac{\text{nom}}{(j\omega L_{LC} + Z_h + Z_s) \cdot \begin{pmatrix} (j\omega L_{LC})^2 + (Z_h + 3Z_s) \cdot \\ (j\omega L_{LC}) + 2Z_s Z_h \end{pmatrix}} \quad \text{EQ. 22}$$

$$= \cfrac{\text{nom}}{\left(j\omega L_{LC} + \frac{3}{2}Z_h\right) \cdot \begin{pmatrix} (j\omega L_{LC})^2 + \left(\frac{5}{2}Z_h\right) \cdot \\ (j\omega L_{LC}) + Z_h^2 \end{pmatrix}}$$

$$= \cfrac{\text{nom}}{\left(j\omega L_{LC} + \frac{3}{2}Z_h\right) \cdot (j\omega L_{LC} + 2Z_h) \cdot \left(j\omega L_{LC} + \frac{1}{2}Z_h\right)}.$$

Applying the same substitution for $Z_h$ and $Z_s$ as above the resonant frequencies are obtained as follows (compare EQs. 15 and 20):

$$f_1 = \frac{1}{2\pi}\sqrt{\frac{3/2}{L_{LC}C_{km}(d/2)}},$$

$$f_2 = \frac{1}{2\pi}\sqrt{\frac{2}{L_{LC}C_{km}(d/2)}},$$

$$f_3 = \frac{1}{2\pi}\sqrt{\frac{1/2}{L_{LC}C_{km}(d/2)}}.. \quad \text{EQ. 23}$$

This formulae gives 1788, 3098 and 3577 Hz for ETSI40 and ETSI50 cables respectively, 1885, 3265 and 3770 Hz for ETSI63 and 2000, 3463 and 3999 Hz for ETSI32 and ETSI90 cables. In fact, in the 3 cells case—as previously in 2 cell case—satisfactory approximate values were obtained as summarized in TABLE 2:

TABLE 2*

| | | Resonant frequencies | |
|---|---|---|---|
| | | chain matrix multiplication | Continued Fraction Expansion (imp~C) |
| ETSI32 | $f_1$ | 1930 Hz | 2000 Hz |
| | $f_2$ | 3500 Hz | 3463 Hz |
| | $f_3$ | >4000 Hz | 3999 Hz |
| ETSI40 | $f_1$ | 1750 Hz | 1788 Hz |
| | $f_2$ | 3109 Hz | 3098 Hz |
| | $f_3$ | 3609 Hz | 3577 Hz |
| ETSI50 | $f_1$ | 1773 Hz | 1788 Hz |
| | $f_2$ | 3094 Hz | 3098 Hz |
| | $f_3$ | 3602 Hz | 3577 Hz |

TABLE 2*-continued

| | | Resonant frequencies | |
|---|---|---|---|
| | | chain matrix multiplication | Continued Fraction Expansion (imp~C) |
| ETSI63 | $f_1$ | 1875 Hz | 1885 Hz |
| | $f_2$ | 3258 Hz | 3265 Hz |
| | $f_3$ | 3781 Hz | 3770 Hz |
| ETSI90 | $f_1$ | 1984 Hz | 2000 Hz |
| | $f_2$ | 3453 Hz | 3463 Hz |
| | $f_3$ | 3992 Hz | 3999 Hz |

*In these tests, the capacitance of the transmission line 104 was used instead of its impedance.

As can be seen in EQs. 15, 20 and 23, the highest frequency for each particular transmission line type is identical irrespective of the number of load coils 114:

$$f_{high} = \frac{1}{2\pi}\sqrt{\frac{2}{L_{LC}C_{km}(d/2)}} \quad \text{EQ. 24}$$

This all can be proved by induction. As discussed above, this was derived for $Z_{in}^{(1)}$, $Z_{in}^{(2)}$ and $Z_{in}^{(3)}$. Next, it is shown that for each integer k, k>1, $Z_{in}^{(k+1)}$ this result is also true. Starting with:

$$Z_{in}^{(k+1)} = \cfrac{1}{\cfrac{1}{Z_h} + \cfrac{1}{j\omega L_{LC} + \cfrac{1}{\cfrac{1}{Z_h} + \cfrac{1}{Z_{in}^{(k)}}}}}$$

$$= \cfrac{1}{\cfrac{1}{Z_h} + \cfrac{1}{j\omega L_{LC} + \cfrac{Z_h \cdot Z_{in}^{(k)}}{Z_h + Z_{in}^{(k)}}}}$$

$$= \cfrac{1}{\cfrac{1}{Z_h} + \cfrac{Z_h + Z_{in}^{(k)}}{j\omega L_{LC} \cdot (Z_h + Z_{in}^{(k)}) + Z_h \cdot Z_{in}^{(k)}}}$$

$$= \frac{Z_h \cdot (j\omega L_{LC} \cdot (Z_h + Z_{in}^{(k)}) + Z_h \cdot Z_{in}^{(k)})}{j\omega L_{LC} \cdot (Z_h + Z_{in}^{(k)}) + Z_h \cdot Z_{in}^{(k)} + Z_h \cdot (Z_h + Z_{in}^{(k)})}$$

$$= \frac{j\omega L_{LC} \cdot Z_h^2 + (j\omega L_{LC} + Z_h) \cdot Z_h \cdot Z_{in}^{(k)}}{j\omega L_{LC} \cdot Z_h + Z_h^2 + (j\omega L_{LC} + 2Z_h) \cdot Z_{in}^{(k)}}.$$

Then, a rational polynomial representation is used for $$Z_{in}^{(k)}, Z_{in}^{(k)} = \frac{num^{(k)}}{den^{(k)}} \quad \text{EQ. 26}$$

$$Z_{in}^{(k+1)} = \frac{j\omega L_{LC} \cdot Z_h^2 + (j\omega L_{LC} + Z_h) \cdot Z_h \cdot \frac{num^{(k)}}{den^{(k)}}}{j\omega L_{LC} \cdot Z_h + Z_h^2 + (j\omega L_{LC} + 2Z_h) \cdot \frac{num^{(k)}}{den^{(k)}}}$$

$$= \frac{j\omega L_{LC} \cdot Z_h^2 \cdot den^{(k)} + (j\omega L_{LC} + Z_h) \cdot Z_h \cdot num^{(k)}}{(j\omega L_{LC} \cdot Z_h + Z_h^2) \cdot den^{(k)} + (j\omega L_{LC} + 2Z_h) \cdot num^{(k)}}.$$

This implies that if denominator of $Z_{in}^{(k)}$ has a root at $(j\Omega L_{LC}+2Z_h)$ then it has $Z_{in}^{(k\Leftarrow 1)}$. Hence, it is true for all n, n>1, i.e. for arbitrary number of load coils 114 that the highest resonant frequency is $$f_{high} = \frac{1}{2\pi}\sqrt{\frac{2}{L_{LC}C_{km}(d/2)}}.$$

However, this technique provides only the correct positions of the peaks; the spectra of the input impedance remains severely distorted. If one wants to have an "accurate" equivalent model, then the impedance transformation along the transmission line 104 needs to be taken into account. This can be done by modifying the continued fraction expansion so it includes the propagation equations in recursion. In other words, one can replace the impedances in EQ. 16 by transformation and then calculate the exact impedances at all of the interesting points. To help illustrate this point, three examples of Matlab code are provided:

I. An algorithm that calculates the resonance frequencies using continued fraction expansion and "true" line impedances follows:

```
Zlc      = j*omega'*Lcoil;
cabLength = SectLength/2; ABCD-matrix-generator; Zh = A./C;
cabLength = SectLength; ABCD-matrix-generator; Zs = A./C;
tempi    = Zlc + Zh;
for Ncell = 1:Ncells-1
    tempi = 1./Zs + 1./tempi;
    tempi = Zlc  + 1./tempi;
end
tempi    = 1./Zh + 1./tempi;
tempi    = 1./tempi;
```

II. An algorithm that calculates the resonance frequencies using continued fraction expansion and replacing impedances by consecutive load transformation follows:

```
Zlc      = j*omega'*Lcoil;
cabLength = SectLength/2; ABCD-matrix-generator; Zh = A./C;
cabLength = SectLength;   ABCD-matrix-generator;
tempi    = Zlc + Zh;
for Ncell = 1:Ncells-1
    tempi = (A.*tempi+B)./(C.*tempi+D);
    tempi = Zlc + tempi;
end
cabLength = SectLength/2; ABCD;
tempi    = (A.*tempi+B)./(C.*tempi+D);
```

III. The last model is equivalent to approximating impedances $Z_h$ and $Z_s$ by capacitance as follows:

```
Zlc      = j*omega'*Lcoil;
Zh       = 1./(jwC(line,:)*SectLength/2);
Zs       = 1./(jwC(line,:)*SectLength);
tempi = Zlc + Zh;
for Ncell = 1:Ncells-1
    tempi = 1./Zs + 1./tempi;
    tempi = Zlc  + 1./tempi;
end
tempi    = 1./Zh + 1./tempi;
tempi    = 1./tempi;
```

Figure 14A:
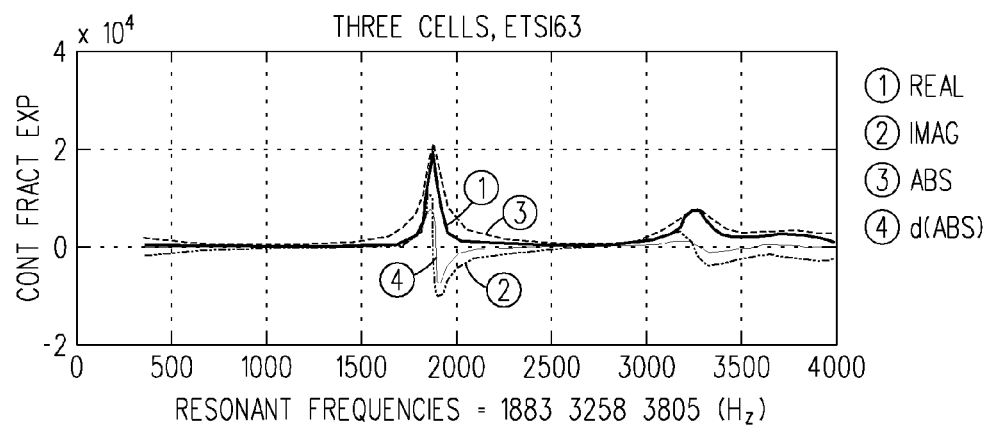
Figure 14B:
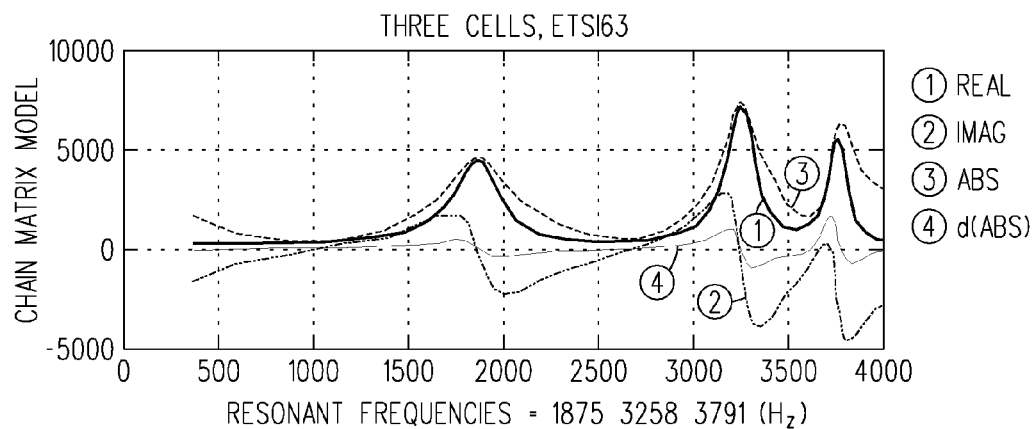
Figure 15:
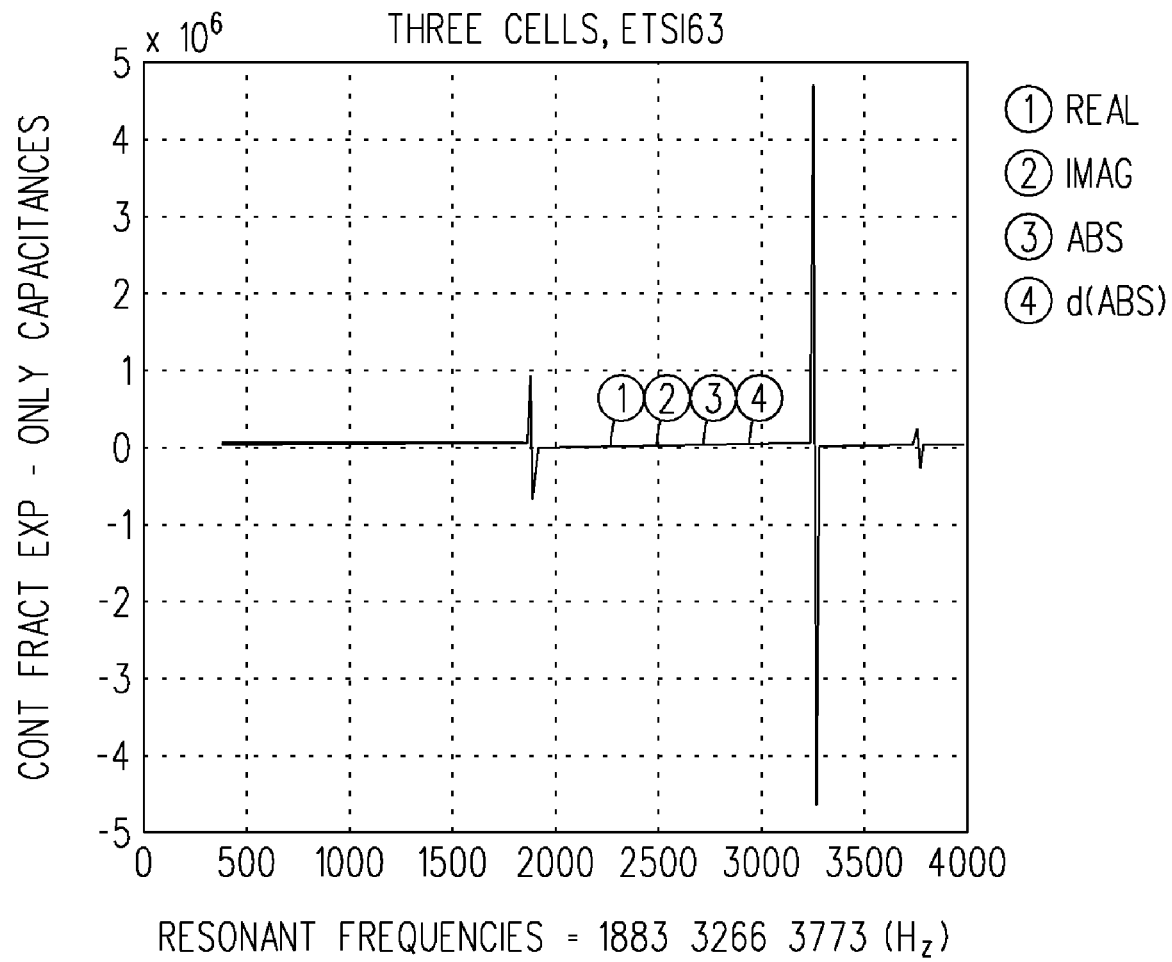

The results obtained by using these models are illustrated in FIGS. 14 and 15. FIGS. 14A and 14B illustrate graphs which can be used to compare the spectral model obtained using the approximation with continued fraction expansion and the "true" model obtained using chain matrix multiplication, respectively. And, FIG. 15 illustrates a graph of the spectral model which was obtained using the approximation with continued fraction expansion and capacitances of cables. As can be seen, the "accurate" option (i.e. using chain matrix multiplication) can be used but it does not lead to a substantial improvement with respect to determining the resonant frequencies.

7. Conclusions

The present invention enables one to detect and estimate the number of load coils 114 (1, 2, 3 or more) within a transmission line 104. And, the present invention enables one to determine the distance from CO 102 to the first load coil 114 by examination of the frequency shift which corresponds to the highest resonance frequency. Moreover, it can be seen that the present invention's algorithms are robust and numerically inexpensive.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A method for detecting a load coil within a transmission line, said method comprising the steps of:
measuring an input impedance $Z_{in}$ of said transmission line;
obtaining a real valued curve of the measured input impedance $Z_{in}$ by taking a derivative of the absolute value of the measured input impedance $Z_{in}$;
determining if there is a zero crossing in the real valued curve of the measured input impedance $Z_{in}$;
if yes, determining if the zero crossing corresponds with a maxima within an absolute value of the measured input impedance $Z_{in}$;
if yes, then said transmission line contains a load coil.

2. The method of claim 1, wherein if the absolute value of the measured input impedance $Z_{in}$ is not a monotonically decreasing function and has no maxima then perform the following steps:
transforming the measured input impedance $Z_{in}$ as follows:

$$Z_{in-trans} = \frac{A \cdot Z_{in-meas} + B}{C \cdot Z_{in-meas} + D}$$

where chain matrix elements A, B, C and D correspond to the artificial cable; and
using the transformed measured input impedance $Z_{in-trans}$ to determine whether or not there is a load coil in the transmission line.

3. The method of claim 1, wherein said real valued curve is obtained by applying the measured input impedance $Z_{in}$ to:

$$\frac{\partial(abs(Z_{in}))}{\partial \omega} \cong \frac{\partial(real(Z_{in}))}{\partial \omega} \cdot real(Z_{in}) + \frac{\partial(imag(Z_{in}))}{\partial \omega} \cdot imag(Z_{in}).$$

4. The method of claim 1, further comprising a step of determining how many zero crossing(s)/maxima(s) are associated with the measured input impedance $Z_{in}$, where the number of zero crossing(s)/maxima(s) corresponds to the number of load coil(s) located within said transmission line.

5. The method of claim 1, further comprising a step of determining a distance that the detected load coil is located from a central office.

6. The method of claim 5, wherein said distance is determined by using a resonance frequency associated with the measured input impedance $Z_{in}$.

7. The method of claim 6, wherein said resonance frequency is represented by:

$$f = \frac{1}{2\pi} \cdot \sqrt{\frac{2}{L_{LC} C_{km}(d/2)}}$$

where:
$L_{LC}$ is inductance of the detected load coil;
$C_{km}$ is capacitance per km of the transmission line; and
d/2 is the distance from said central office to the first load coil 114; and
wherein said d/2 is represented by:

$$\frac{d}{2} = \frac{2}{(2\pi f)^2 L_{LC} C_{km}}.$$

8. A device, comprising:
a processor;
a memory; and
instructions accessible from said memory and processable by said processor, wherein said instructions enable said processor to:
measure an input impedance $Z_{in}$ of said transmission line:
obtain a real valued curve of the measured input impedance $Z_{in}$ by taking a derivative of the absolute value of the measured input impedance $Z_{in}$;
determine if there is a zero crossing in the real valued curve of the measured input impedance $Z_{in}$;
if yes, determine if the zero crossing corresponds with a maxima within an absolute value of the measured input impedance $Z_{in}$;
if yes, then said transmission line contains a load coil.

9. The device of claim 8, wherein if the absolute value of the measured input impedance $Z_{in}$ is not a monotonically decreasing function and has no maxima then said processor:
transforms the measured input impedance $Z_{in}$ as follows:

$$Z_{in-trans} = \frac{A \cdot Z_{in-meas} + B}{C \cdot Z_{in-meas} + D}$$

where chain matrix elements A, B, C and D correspond to the artificial cable; and
uses the transformed measured input impedance $Z_{in-trans}$ to determine whether or not there is a load coil in the transmission line.

10. The device of claim 8, wherein said processor obtains the real valued curve by applying the measured input impedance $Z_{in}$ to:

$$\frac{\partial(\text{abs}(Z_{in}))}{\partial \omega} \cong \frac{\partial(\text{real}(Z_{in}))}{\partial \omega} \cdot \text{real}(Z_{in}) + \frac{\partial(\text{imag}(Z_{in}))}{\partial \omega} \cdot \text{imag}(Z_{in}).$$

11. The device of claim 8, wherein said processor also determines how many zero crossing(s)/maxima(s) are present within the real valued curve of the input impedance $Z_{in}$, where the number of zero crossing(s)/maxima(s) corresponds to the number of load coil(s) located within said transmission line.

12. The device of claim 8, wherein said processor also determines a distance that the detected load coil is located from a central office.

13. The device of claim 12, wherein said processor determines the distance by using a resonance frequency associated with the measured input impedance $Z_{in}$.

14. The device of claim 13, wherein said resonance frequency is represented by:

$$f = \frac{1}{2\pi} \cdot \sqrt{\frac{2}{L_{LC} C_{km}(d/2)}}$$

where:
$L_{LC}$ is inductance of the detected load coil;
$C_{km}$ is capacitance per km of the transmission line; and
d/2 is the distance from said central office to the first load coil 114; and
wherein said d/2 is represented by:

$$\frac{d}{2} = \frac{2}{(2\pi f)^2 L_{LC} C_{km}}.$$

15. A central office, comprising:
a workstation; and
a plurality of line cards, wherein said workstation interacts with said line cards which are connected to a plurality of transmission lines to determine whether or not there is a load coil within one of said transmission lines, wherein said workstation performs the following:
measure an input impedance $Z_{in}$ of said one transmission line;
obtain a real value curve of the measured input impedance $Z_{in}$ by taking a derivative of the absolute value of the measured input impedance $Z_{in}$;
determine if there is a zero crossing in the real valued curve of the measured input impedance $Z_{in}$;
if yes, determine if the zero crossing corresponds with a maxima within an absolute value of the measured input impedance $Z_{in}$;
if yes, then said transmission line contains a load coil.

16. The central office of claim 15, wherein if the absolute value of the measured input impedance $Z_{in}$ is not a monotonically decreasing function and has no maxima then said workstation:
transforms the measured input impedance $Z_{in}$ as follows:

$$Z_{in-trans} = \frac{A \cdot Z_{in-meas} + B}{C \cdot Z_{in-meas} + D}$$

where chain matrix elements A, B, C and D correspond to the artificial cable; and
uses the transformed measured input impedance $Z_{in-trans}$ to determine whether or not there is a load coil in the transmission line.

17. The central office of claim 15, wherein said workstation obtains the real valued curve by applying said measured input impedance $Z_{in}$ to:

$$\frac{\partial(\text{abs}(Z_{in}))}{\partial \omega} \cong \frac{\partial(\text{real}(Z_{in}))}{\partial \omega} \cdot \text{real}(Z_{in}) + \frac{\partial(\text{imag}(Z_{in}))}{\partial \omega} \cdot \text{imag}(Z_{in}).$$

18. The central office of claim 15, wherein said workstation also determines how many zero crossing(s)/maxima(s) are present within the real valued curve of the measured input impedance $Z_{in}$, where the number of zero crossing(s)/maxima(s) corresponds to the number of load coil(s) located within said one transmission line.

19. The central office of claim 15, wherein said workstation also determines a distance to the detected load coil by using a resonance frequency associated with the measured input impedance $Z_{in}$.

20. The central office of claim 19, wherein said resonance frequency is represented by:

$$f = \frac{1}{2\pi} \cdot \sqrt{\frac{2}{L_{LC} C_{km}(d/2)}}$$

where:
$L_{LC}$ is inductance of the detected load coil;
$C_{km}$ is capacitance per km of the transmission line; and
d/2 is the distance from said central office to the first load coil 114; and
wherein said d/2 is represented by:

$$\frac{d}{2} = \frac{2}{(2\pi f)^2 L_{LC} C_{km}}.$$

\* \* \* \* \*

UNITED STATES PATENT AND TRADEMARK OFFICE
CERTIFICATE OF CORRECTION

PATENT NO. : 7,395,162 B2
APPLICATION NO. : 11/276599
DATED : July 1, 2008
INVENTOR(S) : Fertner et al.

It is certified that error appears in the above-identified patent and that said Letters Patent is hereby corrected as shown below:

In Column 6, Line 46, in Equation 4, delete " $Z_0 \cdot \left\{ \sinh(\gamma d) + \frac{j\omega L_{LC}}{2Z_0} \right.$ " and insert -- $Z_0 \cdot \left\{ \sinh(\gamma d) + \frac{j\omega L_{LC}}{Z_0} \right.$ --, therefor.

In Column 7, Line 8, in Equation 7, delete " $\sinh(\gamma d) + \frac{j\omega L_{LC}}{2Z_0} \cdot \sinh^2\left(\frac{\gamma d}{2}\right)$ " and insert -- $\sinh(\gamma d) + \frac{j\omega L_{LC}}{Z_0} \cdot \sinh^2\left(\frac{\gamma d}{2}\right)$ --, therefor.

In Column 7, Line 65, delete "Matab" and insert -- Matlab --, therefor.

In Column 11, Line 10, in Equation 16, delete " $\frac{1}{Z_h} + \frac{1}{j\omega L + \frac{Z_s \cdot (j\omega L_{LC} + Z_h)}{j\omega L_{LC} + Z_h + Z_s}}$ " and insert -- $\frac{1}{Z_h} + \frac{1}{j\omega L_{LC} + \frac{Z_s \cdot (j\omega L_{LC} + Z_h)}{j\omega L_{LC} + Z_h + Z_s}}$ --, therefor.

In Column 11, Line 14, in Equation 16, delete

" $j\omega L_{LC} \cdot (j\omega L_{LC} + Z_h + Z_s) + (j\omega L_{LC} + Z_h)$ " and insert -- $j\omega L_{LC} \cdot (j\omega L_{LC} + Z_h + Z_s) + Z_s \cdot (j\omega L_{LC} + Z_h)$ --, therefor.

In Column 11, Line 24, in Equation 17, delete

" $\text{den}(Z_{in}^{(2)}) = (j\Omega L_{LC} + Z_h) \cdot (j\Omega L_{LC} + Z_h + 2Z)$ " and insert -- $den(Z_{in}^{(2)}) = (j\omega L_{LC} + Z_h) \cdot (j\omega L_{LC} + Z_h + 2Z_s)$ --, therefor.

UNITED STATES PATENT AND TRADEMARK OFFICE
CERTIFICATE OF CORRECTION

PATENT NO. : 7,395,162 B2
APPLICATION NO. : 11/276599
DATED : July 1, 2008
INVENTOR(S) : Fertner et al.

It is certified that error appears in the above-identified patent and that said Letters Patent is hereby corrected as shown below:

In Column 11, Line 34, in Equation 19, delete " $(j\Omega L_{LC} + Z_h) \cdot (j\Omega L_{LC} + 2Z_h)$ "

and insert -- $(j\omega L_{LC} + Z_h) \cdot (j\omega L_{LC} + 2Z_h)$ --, therefor.

In Column 14, Line 2, delete " $(j\Omega L_{LC} + 2Z_h)$ " and insert

-- $(j\omega L_{LC} + 2Z_h)$ --, therefor.

In Column 14, Line 2, delete " $Z_{in}^{(k-1)}$ " and insert -- $Z_{in}^{(k+1)}$ --, therefor.

Signed and Sealed this

Sixteenth Day of June, 2009

JOHN DOLL
*Acting Director of the United States Patent and Trademark Office*